United States Patent [19]

Gorenc et al.

[11] 4,231,246
[45] Nov. 4, 1980

[54] CRIMPING TOOL FOR TUBULAR-LIKE OBJECTS AND METHOD

[76] Inventors: Edward J. Gorenc, 19014 Chickasaw, Cleveland, Ohio 44119; Ulles E. Fox, 14406 Sylvia Ave., Cleveland, Ohio 44110; Imre A. Lesko, 1318 Washington Blvd., Mayfield Hts., Ohio 44114

[21] Appl. No.: 956,368

[22] Filed: Oct. 31, 1978

[51] Int. Cl.³ .................... B21D 15/03; B21D 37/00
[52] U.S. Cl. .............................. 72/412; 29/426.4; 29/727; 72/453.16
[58] Field of Search .............. 72/412, 453.15, 453.16, 72/416, 410, 414, 369, 367; 29/157.4, 426, 726, 727; 30/180, 241

[56] References Cited

U.S. PATENT DOCUMENTS

| | | | |
|---|---|---|---|
| 2,158,855 | 5/1939 | Eby | 72/453.15 |
| 2,180,979 | 11/1939 | Eby | 72/453.15 |
| 2,744,429 | 5/1956 | Seely | 72/367 |
| 3,922,780 | 12/1975 | Green | 30/241 |
| 3,992,777 | 11/1976 | Perkins | 30/180 |
| 4,136,549 | 1/1979 | Lytle | 72/453.16 |

Primary Examiner—Francis S. Husar
Assistant Examiner—Gene P. Crosby
Attorney, Agent, or Firm—Baldwin, Egan, Walling & Fetzer

[57] ABSTRACT

A portable tool and associated method for exerting crimping-like pressure on a tubular-like object, such as a boiler tube or the like, for deforming the latter from the exterior thereof, in order to diminish its peripheral dimension and facilitate its removal from secured relation to a boiler drum or the like; the tool comprises a frame with a power unit coacting with the frame and having a force applying head coupled to the power unit for applying a crimping force along an area running generally lengthwise of the exterior of the tubular-like object, when the latter is held between the frame and the head.

18 Claims, 10 Drawing Figures

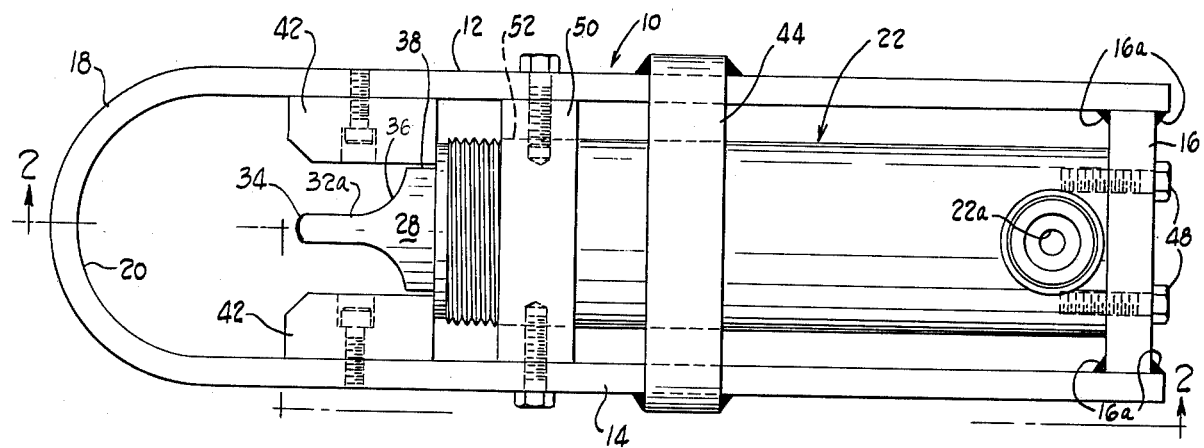
Fig. 1
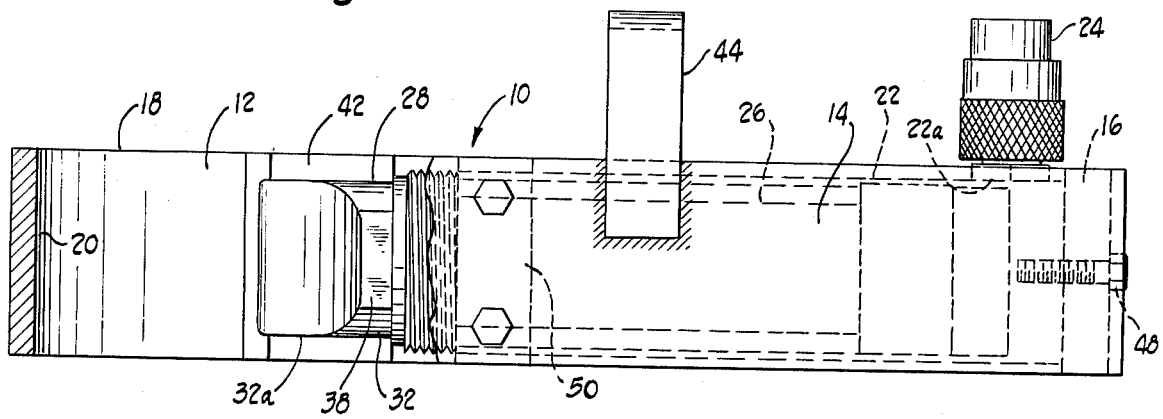
Fig. 2
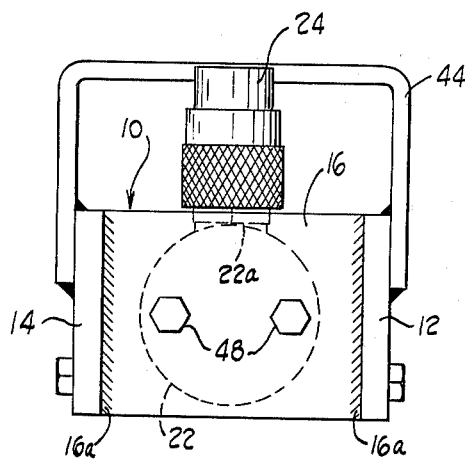
Fig. 3
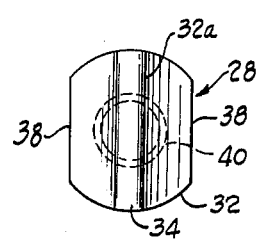
Fig. 6
Fig. 5
Fig. 4

CRIMPING TOOL FOR TUBULAR-LIKE OBJECTS AND METHOD

This invention relates in general to a tool adapted for exerting a crimping-like pressure on a tubular-like object such as a boiler tube of a water-tube boilder, or the like, for facilitating its removal from secured relation to the associated boiler drum or the like, and more particularly relates to a tool of the aforementioned type which is operable to expeditiously deform the tubular-like object along an area running generally lengthwise of the object, commencing generally adjacent the base of its connection to the boiler drum. The invention also discloses a novel method for removing a tubular-like object, such as a boiler tube, from its attached relation to a boiler drum, during for instance retubing of the boiler.

BACKGROUND OF THE INVENTION

Heretofore, in the replacement of a boiler tube or the retubing of a water-tube boiler, air hammers have been conventionally utilized to remove the boiler tubes from their secured friction fit relation in their associated openings in the boiler drum. Such use of air hammers not only requires substantial skill in order to not do considerable damage to the boiler drum; however, even when utilizing substantial care, the air hammers gouge out and deform the openings in the associated drum in which the tubes are mounted. Such conventional retubing process takes considerable time and is quite expensive. Also the damage done to the boiler drum and tube openings therein by the air hammer has to be repaired, utilizing welds and the like, all of which contributes to a resultant relatively expensive procedure.

SUMMARY OF THE INVENTION

The present invention provides a novel tool which can be utilized to effectively crimp a tubular-like object, such as crimping a boiler tube adjacent its connection to a drum, and materially facilitates its removal from its secured relation, such as in the associated opening in an associated boiler drum. The invention also provides a novel method for facilitating the removal of a boiler tube from the boiler drum during the replacement of a tube or the complete retubing of a boiler.

Accordingly, an object of the invention is to provide a novel tool for facilitating the removal of a tubular-like article from secured relation.

A still further object of the invention is to provide a tool of the aforesaid type which is readily portable and which will effectively crimp a tubular-like object such as a boiler tube, thereby decreasing its peripheral dimension, in a manner to facilitate its removal from attached relation to an associated boiler drum.

A still further object of the invention is to provide a tool of the aforedescribed type which includes a frame and reciprocal fluid power means mounted on the frame and adapted for extension and retraction lengthwise of the frame, with the power means having a crimping head secured thereto, and with the frame including an abutment section adapted to receive therethrough the tubular-like object, such as the boiler tube, and between the abutment section and the crimping head, for applying a crimping force to the tubular-like object upon application of pressurized fluid to the power means to cause extension thereof.

A still further object of the invention is to provide a novel method for facilitating the removal of tubular-like objects from secured relation, such as for instance, during the retubing of a boiler, and in a manner which materially facilitates the removal of the tubes from a boiler drum, and materially reduces the cost of performing such an operation.

Other objects and advantages of the invention will be apparent from the following description taken in conjunction with the accompanying drawings, wherein:

BRIEF DESCRIPTION OF THE DRAWINGS

FIG. 1 is a top plan view of the tool embodying the invention.

FIG. 2 is a partially broken, side elevational view of the FIG. 1 tool.

FIG. 3 is a rear end elevational view of the tool of FIGS. 1 and 2.

FIG. 4 is a top plan view of the crimping head of the tool which is adapted for applying a crimping force to the tubular-like object to be deformed for removal.

FIG. 5 is a side elevational view of the FIG. 4 head.

FIG. 6 is a front end elevational view of the crimping head of FIGS. 4 and 5.

DESCRIPTION OF PREFERRED EMBODIMENT

Figure 7:
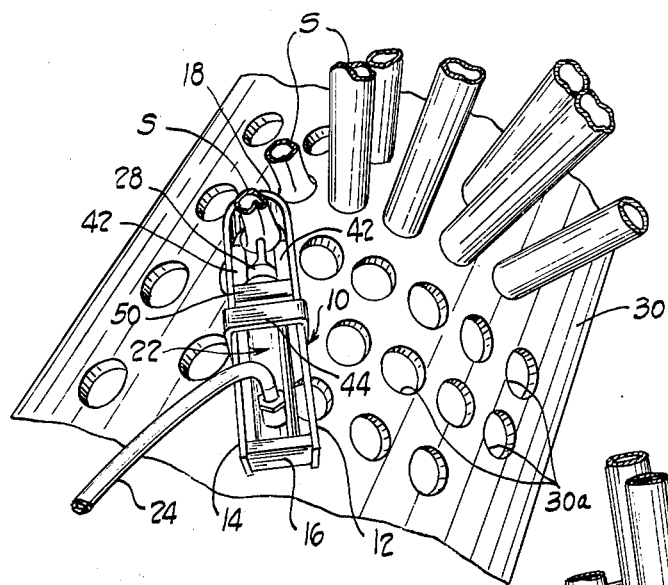
FIG. 7 is a fragmentary, generally perspective view of the tool operating on a boiler tube stub section, and having applied a crimp thereto, in the method of removal of the boiler tube stub section from the boiler drum.

The tool in the embodiment illustrated, comprises a frame 10 including side wall portions 12 and 14 and rear end wall 16 extending between and connecting the side wall portions 12 and 14. In the embodiment illustrated, the frame 10 is of fabricated construction, with the rear wall 16 being attached by means of welds 16a to the side wall portions.

At the forward end of the frame, the side wall portions 12 and 14 in the embodiment illustrated, curve inwardly and merge to form closed collar portion 18 on the frame. The collar portion 18 is adapted to receive therethrough a tubular-like object to be deformed or crimped, such as for instance, a tube stub section S of a boiler with the tubular-like object being adapted for abutting engagement with the interior surface 20 of the collar-like portion. As can be seen from FIGS. 1 and 2, side wall portions 12 and 14 may be formed from a single member bent into generally a U-shaped configuration.

A reciprocal fluid power means 22 (FIGS. 1 and 2) is mounted on the frame 10, with the power means 22, in the embodiment illustrated, comprising, a single acting spring return, piston and cylinder motor unit. The input port 22a to the unit is coupled as by means of a flexible hose or line 24, to a source of pressurized fluid, such as a hydraulic pump and reservoir supply of hydraulic fluid, and a control valve therefor (not shown) which is adapted to furnish pressurized hydraulic fluid to the motor unit 22 and cause outward extension of the piston rod 26 thereof. As aforementioned, a spring may automatically return the piston rod inwardly back to its starting position in the conventional manner, upon shutting off of the flow of hydraulic fluid to the power unit as by means of the aforementioned control valve therefor.

Figure 8:
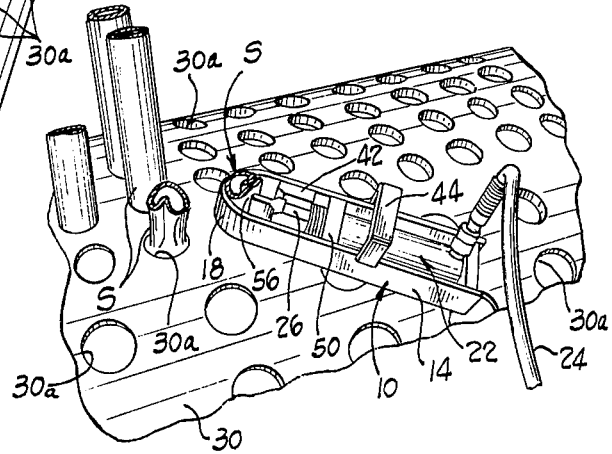
FIG. 8 is a perspective view of a further positioning of the tool with respect to a boiler tube stub section, for further crimping thereof.
Figure 9:
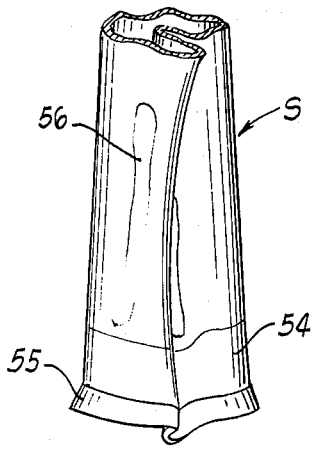
FIG. 9 is a side elevational view of a stub section of a steel boiler tube which has been crimped and removed from its associated drum, utilizing the tool and method of the invention.
Figure 10:
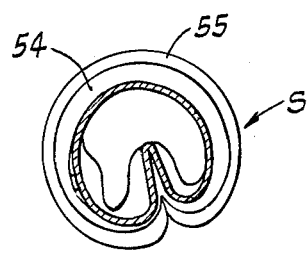
FIG. 10 is a top plan view of the crimped tube stub section illustrated in FIG. 9.

Attached to the piston rod 26 of the power unit is a crimping head 28 (FIGS. 3, 4 and 5). Crimping head 28 is adapted to apply force to the wall of the tubular-like object upon application of pressurized fluid to the aforementioned power means 22, crimping the tubular-like object along an area running generally lengthwise thereof, therefore, deforming the tubular-like object inwardly and separating or stripping it from its attached condition to the boiler drum 30 (FIGS. 7 and 8). The boiler tubes are conventionally attached in friction fit, fluid tight, secured relation in their respective tank openings 30a.

Crimping head 28 comprises body section 32 and a nose section 32a projecting forwardly from the base section. Nose section 32a provides a generally vertically extending web, which is of relatively narrow width as compared to the body section 32. On its forward surface, nose 32a is rounded as at 34, as can be seen in FIGS. 1 and 4. The web as can be best seen in FIG. 4, merges in smooth curves with the body section 32, and as at 36. The side surfaces 38 of the body section 32 are generally vertically extending for a reason to be hereinafter described.

Projecting rearwardly from the body 32, is a base section 40, which in the embodiment illustrated, is externally threaded and is adapted to be received in threaded assembly with a female threaded portion (not shown) of the piston rod of the power unit 22, for ready securement of the crimping head to the piston rod.

The frame is preferably provided with guide means in the form in the embodiment illustrated, of blocks 42 (FIG. 1) secured to the inner surfaces of the side walls adjacent the crimping head 28, with the guide blocks being preferably formed of reduced friction material, such as a plastic or Micarta. Such guide blocks 42 are adapted to coact with the aforementioned vertical side surfaces 38 on the crimping head to prevent rotation or turning of the head about the longitudinal axis of the power means, thereby maintaining a generally vertically extending crimping force area applied to the tubular-like object to be removed, upon application of the pressurized fluid to the power means 22. Such guide blocks or plates extend for the full forward stroke of the crimping head so that the generally vertical side surfaces 38 of the crimping head will always coact at least in part with the guide blocks. As can be seen, clearances are provided between the side surfaces 38 of the crimping head and the confronting surface of the respective guide block. Engagement of the crimping head with the guide block is adapted to occur if the crimping head commences to rotate about the longitudinal axis of the power means.

As can be best seen in FIG. 2, the lower or bottom extremity of the crimping head is disposed close to the bottom surface of the frame, so that the crimping force is applied to the tubular-like object to be removed close to its lowermost secured connection to the boiler drum.

The tool preferably includes a handle 44 secured to the frame generally adjacent the center of gravity of the tool so that the tool is readily portable by merely lifting upwardly on the handle, thereby facilitating its application to the tubular-like object to be removed, and especially to the retubing of a boiler.

In the embodiment illustrated, the power means is secured to the end wall 16 of the frame by means of spaced threaded fasteners 48 threaded into the end of the cylinder, and removably secure the power cylinder to the frame.

Also, the forward end portions of the power cylinder is anchored to the side wall portions of the frame by means of an anchoring block or web 50, which extends between the side walls 12 and 14 and is secured thereto by threaded fastener means, in the embodiment illustrated. The anchoring web has an opening 52 therethrough, through which the forward end of the power cylinder 22 is received in generally slip-fit relation. It will be seen that such anchoring means prevents tilting or buckling of the power means 22 about its rear connection to the frame upon application of pressurized fluid to the power means to apply a crimping force to a tubular-like object.

Operation of the tool and the method for removing a tubular-like object such as a metal boiler tube from anchored relationship to another member, such as a boiler drum, is preferably as follows. In the refurbishing of a water-tube boiler and the replacing of the tubes thereof, the tubes are conventionally cut off as by means of a cutting torch, so as to leave a tube stub section S (FIGS. 7 and 8) extending upwardly from the secured relation to the boiler tank or drum. The metal tubes are conventionally secured to the drum by an extremely tight friction fit (area 54 of the tube) and a beveled end (area 55 of the tube) and heretofore have been removable by the use of an air hammer or the like, chipping away at the tube connection to the drum, to physically force the tube from the associated opening in the boiler drum, all of which operation has often resulted in damage to the drum and the opening through which the tube stub section projected.

In the use of the present tool, the tool is positioned down over the tube stub section so that the tube stub section projects through the collar portion, and the tool is moved longitucinally or lengthwise thereof, so that the tube stub section engages the interior surface 20 of the collar portion. Thereupon the control valve (not shown) for the power means is actuated to apply pressurized fluid via hose 24 to the power means, causing extension of the piston rod thereof, and movement of the crimping head into engagement with the opposite side of the tube stub surface. The crimping head applies an even force to the tubular-like tube stub section along an area commencing generally adjacent the stub section's attachment to the boiler drum, running vertically lengthwise of the stub section, causing crimping of the tube stub section as shown for instance in FIG. 7. This inward crimping deforms the periphery of the tube stub section inwardly, and forces it from attached or secured condition to its associated opening in the boiler drum. In the event that such crimping deformation of the tube stub is not sufficient to cause the tube stub to be readily released from secured condition, then the control valve for the power means can be actuated to cause release of the pressure to the piston thereof, whereupon the crimping head automatically moves rearwardly away from the tube stub section. Thereupon the tool can be swung to a new angular position with respect to its first crimping position, (FIG. 8) and the valve means again actuated to cause application of a further crimping force to the side of the tube stub at a new location (e.g. 56)

thereon, thereby further crimping the tube stub inwardly and ordinarily causing it to be readily separated from its connection to the boiler drum, whereupon it can drop downwardly into the interor of the drum, or can be readily removed through the associated opening 30a in the boiler drum.

It will be seen that use of the tool is very rapid and removal of a tube stub section from its secured connection in the boiler drum opening is materially facilitated and speeded up, thereby materially reducing the costs involved in retubing a boiler or replacing a tube thereof. The tool is light and portable enough so that a single workman utilizing the tool can readily and rapidly accomplish the job of removing the boiler tubes from a boiler. In the past, such a retubing operation normally required a plurality of workmen.

While the tool has been illustrated and described in conjunction with removing tubes and particularly metal boiler tubes from a water-tube boiler, it will be understood that it could likewise be utilized to remove almost any tubular-like object from an anchored or secured condition; for instance, it could be utilized for removal of cast iron pipe, or clay tile pipe in sewer or water supply systems, the force from the crimping head being adequate to either fracture the pipe and/or crimp it inwardly if the tubular object is sufficiently malleable. In connection with steel boiler tubes, the tubes are sufficiently malleable so that inward crimping occurs rather than complete fracturing. It will be seen that the rounded head of the crimping head provides for non-piercing of the boiler tube, but instead results in an inward crimping or deformation of the defining walls thereof. A hydraulic motor unit and pump assembly able to provide 10,000 p.s.i. pressure has been found adequate for removal of most steel tubes of water tube boilers.

The power means 22 in the embodiment illustrated has a maximum stroke of approximately 6 inches. However the movement of the crimping head 28 from its inactive position, as shown in FIG. 1, to an active position, as shown for instance in FIG. 8, is generally approximately 3 inches. It is preferable in accordance with the invention that the maximum stroke of the power means is approximately twice the stroke of the crimping head from an inactive to active crimping position. This aids in stabilizing the unit and in preventing "buckling" and undue stress on the unit, under load (i.e. when the power means 22 is extended in a crimping operation).

From the foregoing description and accompanying drawings, it will be seen that the invention provides a novel tool for exerting a crimping-like pressure on a tubular-like object, such as boiler tube or the like, for physically deforming the latter from the exterior thereof, along an area running generally lengthwise of the tubular-like object, with the tool comprising a frame and a reciprocal fluid power means mounted on the frame and adapted for extension and retraction lengthwise of the frame, with the frame including a collar portion for receiving therethrough the tubular-like object, and with a force applying head secured to the power means for applying a deforming (or fracturing force) to the tubular-like object when the latter is disposed in extending relation through the frame between the collar portion and the head, and upon application of pressurized fluid to the power means for causing extension thereof. The invention also provides a novel method for readily removing tubular-like objects from anchored or secured condition to another member such as a boiler drum or the like.

The terms and expressions which have been used, are used as terms of description, and not of limitation, and there is no intention in the use of such terms and expressions, of excluding any equivalents of any of the features shown, or described, or portions thereof, and it is recognized that various modifications are possible within the scope of the invention claimed.

We claim:

1. In a tool for exerting a crimping like force on a boiler tube or the like, mounted in relatively closely spaced relation to other similar tube elements projecting generally laterally from an associated boiler drum, for physically deforming the tube from the exterior thereof along an area running generally lengthwise of the tube for removal of the latter from attachment to the drum comprising, a frame, reciprocal fluid power means mounted on said frame and adapted for extension and retraction generally lengthwise of the frame, said frame including a closed, relatively thin collar portion at one end thereof disposed generally symmetrically on opposite sides of an axis running lengthwise of said frame and generally parallel to the direction of extension and retraction of said power means, said collar portion being adapted to receive therethrough an associated tube, and a force applying non-piercing head secured to said power means for applying deforming force to the tube when the latter is disposed in extending relation through said collar portion of said frame between said collar portion and said head, and upon application of pressurized fluid to said power means for causing extension of said power means, said collar portion including an underside surface adapted for general engagement with the exterior of the boiler drum in the operative position of the tool wherein an associated tube is received through said collar portion preparatory to removal of the tube, said head commencing generally adjacent the plane of said underside surface and extending generally vertically upwardly therefrom so as to be operative to apply the deforming force lengthwise of the associated tube commencing generally adjacent the connection of the associated tube to the boiler drum.

2. A tool in accordance with claim 1 wherein said head comprises a relatively thin web section extending generally parallel to the vertical longitudinal center plane of said frame with said web section being adapted for applying the crimping-like force to the associated tube, said center plane extending through said axis.

3. A tool in accordance with claim 1 wherein said head comprises a body section and a nose section projecting generally forwardly from said body section, said nose section being a web-like configuration extending generally vertically and being generally rounded, in plan, on its frontal surface, said frontal surface being adapted for force applying engagement with the associated tube commencing generally adjacent the connection of the tube with the drum, and extending a predetermined amount upwardly therefrom lengthwise of the tube for generally the full height of said nose section, and said head having a base section extending rearwardly from said body section and coupling said head to said power means.

4. A tool in accordance with claim 1 wherein said power means comprises a single acting, spring return, hydraulic cylinder unit, with said head being secured to the piston rod of said unit.

5. A tool in accordance with claim 2 wherein said frame at one end thereof is of generally U-shaped configuration in plan including an inwardly facing concave surface and side wall sections extending generally lengthwise from said concave surface, said concave surface comprising said collar portion, said frame including a transverse wall section extending between and connecting said side wall sections, said transverse wall section mounting said power means thereon intermediate said side wall sections, said concave surface providing an abutment for the tube to be deformed, said web section of said head commences generally adjacent said plane of said underside surface of said collar portion of said frame and extends a predetermined distance upwardly to a point generally no higher than the top surface of said frame.

6. A tool in accordance with claim 1 wherein said collar portion is of arcuate configuration in plan and includes a concave inner surface, the latter providing an abutment for the tube to be deformed.

7. A tool in accordance with claim 2 wherein said collar portion is disposed adjacent the forward end of said frame and said power means is coupled to said frame adjacent the other end thereof, and anchoring means coacting with said power means and with said frame generally adjacent the forward end of said power means, for preventing buckling of said power means upon application of a force thereby to an associated tube.

8. A tool in accordance with claim 2 including a handle secured to said frame for convenient manual moving of said tool, said handle projecting laterally from said frame in the general direction in which the associated tube is adapted to extend through the collar portion.

9. A tool in accordance with claim 2 wherein said head includes a body portion, said web section extending forwardly from said body portion, said body portion including generally vertically oriented side surfaces adapted for guiding coaction with stationary means on said frame during said reciprocal movement of said power means, for maintaining the generally vertical orientation of said web section relative to said frame.

10. A tool in accordance with claim 3 wherein said base section of said head is threaded and is connected to said power means by said threaded base section.

11. In a method of removing a tubular-like object, such as a boiler tube or the like, from secured relation to a boiler drum comprising the steps of, severing the object so as to provide a stub section thereof extending outwardly from the exterior of the drum, providing a tool comprising a frame having a reciprocal fluid power means mounted on said frame, for extension and retraction lengthwise of said frame, with said frame including a collar portion, a force applying head secured to said power means for applying a deforming force to the stub section, positioning the tool over the stub section so that the stub section extends through the collar portion intermediate the latter and said head, and actuating the power means to apply deforming force to the stub section along an area lengthwise thereof so as to crimp the stub section and thus reduce the dimension of the exterior periphery of the stub section, thereby loosening it from its secured relation.

12. A method in accordance with claim 11 including the step of swinging the tool relative to the stub section after deforming the stub section, and applying a further force to the exterior wall of the stub section at a new location thereon for further deformation thereof.

13. A method in accordance with claim 11 wherein the crimping force is applied by means of a hydraulic power unit and applying the crimping force lengthwise of the tube stub section, commencing adjacent the secured base of the tube stub section with the boiler drum, and extending a predetermined distance upwardly therefrom.

14. A portable tool for removing a tubular-like object such as a boiler tube from its associated opening in the boiler drum with the tube being mounted in relatively closely spaced relation to other similar tubes projecting laterally from the drum, comprising, in use closed, relatively thin means for engaging the tube from one side thereof commencing generally adjacent the connection of the tube to the drum and extending generally vertically upwardly therefrom generally lengthwise of the tube and in generally non-interfering relation with adjacent tubes, said engaging means including an underside surface adapted for general engagement with the exterior of the boiler drum in the operative condition of the tool with an associated tube coacting with said engaging means, and means coacting with said engaging means for applying crimping force to the opposite side of the tube, the last mentioned force applying means including a relatively thin generally vertically oriented non-piercing web commencing generally adjacent the plane of said underside surface and extending generally vertically upwardly therefrom and fluid power means connected to said web, and being operable to apply crimping force generally lengthwise of the tube commencing generally adjacent the base of the tube where it is secured to the boiler drum and extending for a predetermined distance outwardly along the tube.

15. A tool in accordance with claim 14 wherein the force applying means includes a web-like section attached to said fluid power means and extending generally vertically so as to apply the force to an area running generally lengthwise of the tube with the forward surface of the web-like portion being rounded for abutting non-piercing engagement with the exterior of the boiler tube, said force applying means being reciprocal in the longitudinal vertical center plane of said tool, and a handle projecting laterally from said tool in a direction disposed in said center plane, said handle being adapted for moving said tool from one tube to another tube for crimping thereof.

16. In a portable tool for exerting a crimping-like force on a boiler tube or the like mounted in relatively closely spaced relation to other similar tube elements projecting generally laterally from an associated boiler drum, for physically deforming the tube from the exterior thereof along an area running generally lengthwise of the tube for removal of the latter from attachment to the drum, comprising, a frame, reciprocal fluid power means mounted on said frame and adapted for extension and retraction generally lengthwise of said frame, a force applying, non-piercing head secured to said power means and adapted for reciprocal movement along an axis extending lengthwise of said frame, said frame at said one end thereof including a closed, in use, relatively thin, rigid collar portion which, in plan, is open at the top and bottom thereof for receiving therethrough the associated boiler tube, said collar portion comprising a generally concave inner side surface for engaging an associated tube from one side thereof, said collar portion being adapted for holding the tube from one side thereof in non-interfering relation to adjacent tubes, said frame including side walls extending generally lengthwise of said frame from said collar portion and defining in conjunction with said collar portion a generally U-shaped configuration in plan, said power means being disposed between said side walls, said collar portion including an underside adapted for general engagement with the exterior of the boiler drum in the operative condition of the tool with a boiler tube extending through said collar portion, said head commencing generally adjacent the level of said underside surface and extending upwardly therefrom, said head being adapted to engage the tube from the opposite side thereof for applying deforming force to the associated tube commencing adjacent the connection of the latter to the boiler drum, when the latter tube is disposed in extending relation through said collar portion, and upon application of pressurized fluid to said power means for causing extension of said power means, said collar portion being generally symmetrically arranged on opposite sides of said axis.

17. In a portable tool for exerting a crimping-like force on a boiler tube or the like mounted in relatively closely spaced relation to other similar tube elements projecting generally laterally from an associated boiler drum, for physically deforming the tube from the exterior thereof along an area running generally lengthwise of the tube for removal of the latter from attachment to the drum, comprising, a frame, reciprocal fluid power means mounted on said frame and adapted for extension and retraction generally lengthwise of said frame, a force applying, non-piercing head secured to said power means and adapted for reciprocal movement along an axis extending lengthwise of said frame, said frame at one end thereof including a closed, relatively thin, rigid collar portion which, in plan, is open at the top and bottom thereof for receiving therethrough the associated boiler tube, said collar portion being adapted for holding the tube from one side thereof and in non-interfering relation to adjacent tubes, said head being adapted to engage the tube from the opposite side thereof and being so arranged so as to apply crimping deforming force to the associated tube lengthwise thereof, commencing generally adjacent the base of the latter when the latter tube is disposed in extending relation through said collar portion, and upon application of pressurized fluid to said power means for causing extension of said power means, said collar portion being symmetrically arranged on opposite sides of said axis, and wherein said frame in plan, is of generally U-shape configuration including an arcuate end section at one end of said frame, and generally parallel extending side wall sections, said arcuate end section comprising said collar portion, the other end of said frame having a rear end wall section extending between and connecting said side wall sections, said rear end wall section mounting said power means at one end thereon, and a handle secured to and projecting generally perpendicularly from said frame rearwardly of said collar portion, said handle in use projecting upwardly from said side wall sections and bridging the latter.

18. A tool in accordance with claim 17 wherein said power means comprises a single acting, spring return piston and cylinder unit having a piston rod extending exteriorly from the other end of said power means, said head being secured to said piston rod for movement toward and away from said collar portion, said head comprising a body section and a nose section extending forwardly from said body section, said nose section being of relatively thin web-like configuration extending generally vertically and being generally rounded in a horizontal direction of its frontal surface, said frontal surface being adapted for force applying engagement with an associated tube to crimp the latter upon extension of said power means, said nose section commencing generally adjacent the plane of the underside of said collar portion and extending vertically upwardly to a point no higher than the top surface of said collar portion, said body section including generally vertically oriented side surfaces, anchoring means extending between and connecting said side wall sections, adjacent said other end of said power means and through which the latter extends, and anchoring said power means against buckling upon application of force thereby to an associated tube, and means of reduced friction material secured to said side wall sections adjacent said side surfaces of said body section and adapted to coact with said head for generally preventing rotary turning of the latter about said axis, thereby maintaining the generally vertical orientation of said nose section.

* * * * *

Notice of Adverse Decision in Interference

In interference No. 100,853, involving Patent No. 4,231,246, E. J. Gorenc, U. E. Fox and I. A. Lesko, CRIMPING TOOL FOR TUBULAR-LIKE OBJECTS AND METHOD, final judgment adverse to the patentees was rendered May 13, 1983, as to claims 1, 6, 11, 12, 13, and 16.

[*Official Gazette July 12, 1983.*]